No. 824,533. PATENTED JUNE 26, 1906.
T. A. EDWARDS.
ROLLER BEARING.
APPLICATION FILED JUNE 1, 1903. RENEWED DEC. 6, 1905.
2 SHEETS—SHEET 1.
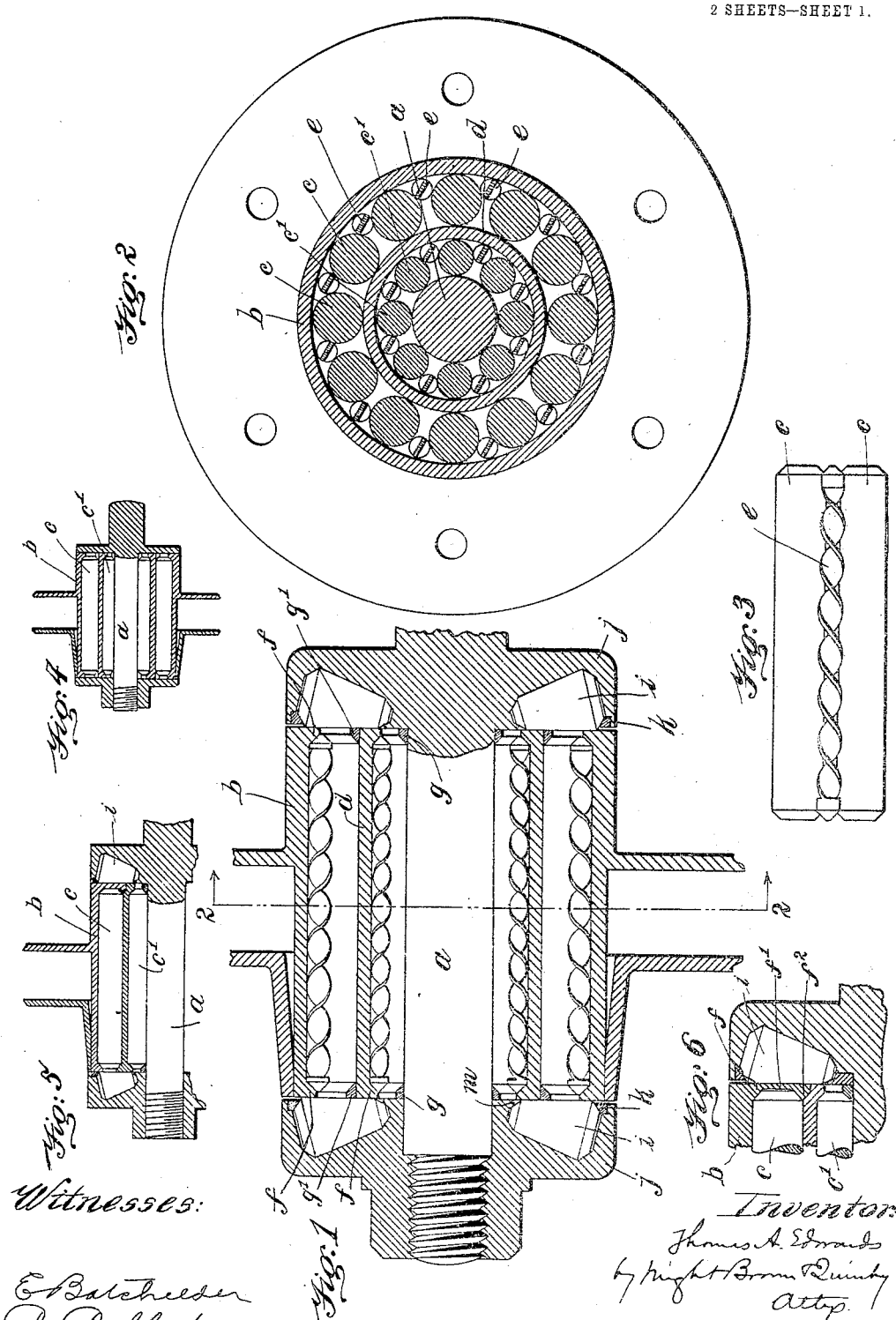
Witnesses:
E. Batchelder
R. Bullock
Inventor:
Thomas A. Edwards
by Wright Brown Quimby
Attys.

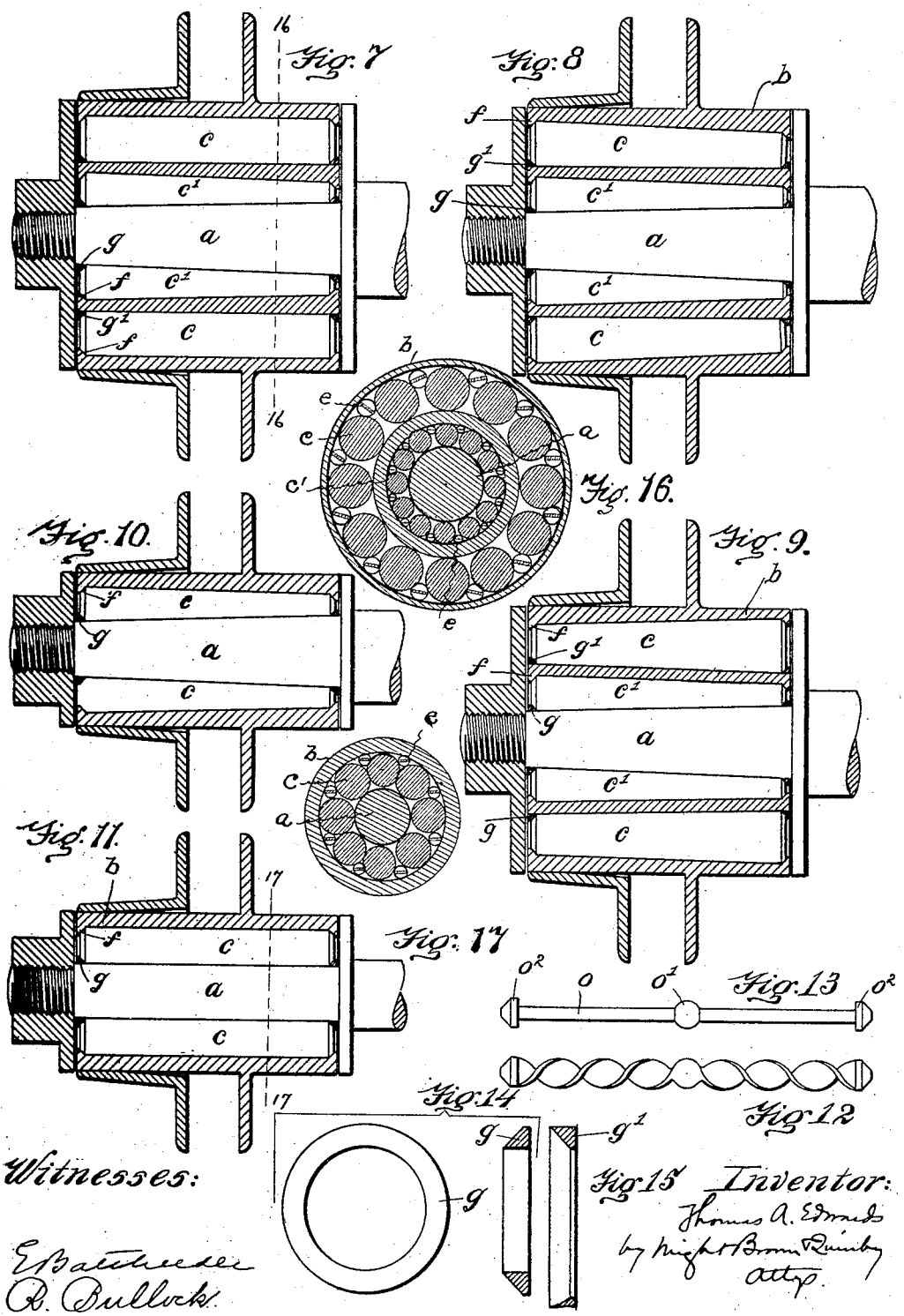

UNITED STATES PATENT OFFICE.

THOMAS A. EDWARDS, OF BOSTON, MASSACHUSETTS.

ROLLER-BEARING.

No. 824,533.　　　Specification of Letters Patent.　　　Patented June 26, 1906.

Application filed June 1, 1903. Renewed December 6, 1905. Serial No. 290,604.

*To all whom it may concern:*

Be it known that I, THOMAS A. EDWARDS, of Boston, in the county of Suffolk and State of Massachusetts, have invented certain new and useful Improvements in Roller-Bearings, of which the following is a specification.

This invention relates to antifriction devices interposed between a central shaft or journal and a hub, casing, or other body surrounding the journal, one of said parts having a rotary motion.

The invention has for its object to provide certain improvements in the said antifriction devices looking to the overcoming of frictional resistance to a greater extent than heretofore; and to this end the invention consists in the improvements which I will now proceed to describe and claim.

Of the accompanying drawings, forming a part of this specification, Figure 1 represents a longitudinal section showing a roller-bearing embodying my invention applied to the arm or journal portion of an axle and a hub adapted to rotate thereon. Fig. 2 represents a section on line 2 2 of Fig. 1. Fig. 3 represents a side view showing two of the rollers and a spiral separator coöperating therewith. Fig. 4 represents a reduced view similar to Fig. 1, but omitting the separators and end-thrust bearing-rollers shown in Fig. 1. Fig. 5 represents a fragmentary sectional view showing a construction similar to that shown in Fig. 1, but omitting the spiral separators. Fig. 6 represents a fragmentary sectional view differing in certain details from the construction shown in Fig. 1. Figs. 7, 8, 9, 10, and 11 represent sectional views showing modifications of my invention. Fig. 12 represents a side view of a modified form of the spiral separator. Fig. 13 represents a side view of an alternative form of separator. Fig. 14 represents a side view and a sectional view of one of the outwardly-projecting flanges or collars, hereinafter referred to. Fig. 15 represents a sectional view of a portion of one of the inwardly-projecting flanges, hereinafter referred to. Fig. 16 is a sectional view on line 16 16, Fig. 7, illustrating the structures employed in Figs. 7, 8, and 9. Fig. 17 is a similar view on line 17 17, Fig. 11, illustrating the structures of Figs. 10 and 11.

The same reference characters indicate the same parts in all the figures.

In the drawings, $a$ represents a journal or shaft which in this embodiment of my invention is shown as the arm of a vehicle-axle. $b$ represents a casing or hub surrounding said journal and separated therefrom by an annular space.

In the embodiments of my invention shown in Figs. 1, 2, 4, 5, 6, 7, 8, and 9 I have shown interposed between the hub or casing $b$ and the journal $a$ two sets or series of antifriction-rollers—namely, an outer set composed of relatively large rollers $c$ and an inner set composed of smaller rollers $c'$. The two sets of rollers are separated from each other by an inner casing or sleeve $d$, which is concentric with the journal and the outer casing and is adapted to rotate with the outer casing, although not attached rigidly thereto, the inner casing being adapted to rotate independently of the outer. The rollers of each series are separated from each other by separators $e$, each of which bears upon the peripheries of two of the rollers and upon the inner surface of the casing surrounding the rollers, as shown in Fig. 2. Each separator $e$ is preferably of spiral form, its structure resembling that of an auger-blade. This form, while giving the separators sufficient space area, reduces to the minimum the friction resulting from the contact of the separators with the rollers and casings and at the same time distributes the wear resulting from such contact, so that there will be no unequal wear and no formation of local grooves in the surfaces of the rolls and casings.

By employing a plurality of sets of rolls arranged as shown and described, each set being separated from the next by a sleeve or casing adapted to rotate independently, I greatly reduce the frictional resistance. I do not limit myself to two series of rollers, it being obvious that the number of series may be increased to any extent desired.

Means are provided for preventing the endwise displacement of the rollers and the separators, said means, as here shown, comprising inwardly-projecting flanges $f f$ at the ends of the casings $b$ and $d$, said flanges being preferably beveled on their inner sides and bearing on the correspondingly-beveled ends of the rollers and separators. To coöperate with the inwardly-projecting flanges $f f$ I provide outwardly-projecting flanges $g g'$, the flanges $g$ being located on the journal $a$, while the flanges $g'$ are located on the inner casing $d$. The flanges $g g'$ are beveled and bear on the beveled ends of the rollers, but do not bear upon the separators. The inwardly-projecting flanges $f$ $f$ are preferably integral with the casings $b$ and $d$, while the outwardly-projecting flanges $g$ $g'$ are preferably made as independent rings. (See Figs. 14 and 15.) These rings may be sprung upon the journal $a$ and inner casing $d$ or secured thereto in any other suitable way.

$i$ $i$ represent frusto-conical end-thrust bearing-rollers, which are supported in recesses formed for their reception in collars $j$ $j$ at the opposite ends of the journal $a$. The rollers $i$ bear against portions of the ends of the outer and inner casings $b$ and $d$ and reduce to the minimum the frictional resistance caused by end thrust. The outer ends of the rolls $i$ $i$ may be retained in the recesses in the collars $j$ $j$ by means of rings $k$ $k$, inserted in the inner sides of the collars and constituting inwardly-projecting flanges formed to bear upon the beveled bases of the rollers $i$. The inner ends of the rolls $i$ $i$ may be retained by inwardly-projecting flanges $m$ $m$, formed on the collars $j$ $j$ and engaging the beveled inner ends of the rollers $i$, or they may be retained by independent rings, like the rings $k$. The rollers $i$ $i$ have a planetary motion in the collars $j$ $j$, each roller rotating on its own axis and revolving around the journal $a$. The recesses in the collars $j$ receiving said rollers constitute continuous circular grooves or races, permitting the planetary motion of the rollers. Separators like the separators $c$, but of tapering or frusto-conical form, may be inserted between the rollers $i$ $i$, each separator bearing simultaneously on two of the rollers $i$ and on the race formed in the collar $j$.

In Fig. 6 I show the inwardly-projecting flange $f$ on the hub or outer casing $b$ provided with an extension $f'$, which projects inwardly over the ends of the rollers $c$ and has a beveled rib $f^2$ engaging the rollers $c$, the said rib taking the place of the outwardly-projecting flange $g'$. (Shown in Fig. 1.) A similar construction is shown on a smaller scale in Fig. 5.

Figs. 7, 8, and 9 show certain modifications in the forms of the rollers and journal, which are sufficiently obvious to be understood without description.

In Figs. 10 and 11 I show one series of rollers instead of a plurality of series, the inner casing $d$ being therefore omitted.

Fig. 13 shows a form of separator which is designed to reduce the extent of frictional or contacting surface. This separator has a reduced body portion $o$, an enlarged central portion $o'$, and enlarged end portions $o^2$, the said enlarged portions being the only parts of the separator that come in contact with the rollers and their casing. I prefer the spiral form of separator, because of the distribution of wear which is effected thereby. The convolutions of the spiral may extend continuously from end to end, as shown in Fig. 3, or there may be two sets of opposite pitch extending from the center of the separator is shown in Fig. 12. When a lubricant is used, the spiral separators act to distribute the lubricant lengthwise of the separators. To insure uniform distribution, some of the separators may have a right-hand pitch and others a left-hand pitch, as shown in Fig. 1. one set of separators conducting the oil in one direction and the other set in the opposite direction. The spiral or auger-blade form of the separators provides extended air-spaces between the rolls, so that there is such a free circulation of air as to enable the bearing to run, in many cases, without oil.

Preferably the rings or outwardly-projecting flanges $g$ $g'$ are not attached to the parts $a$ and $d$, but are loose thereon, so that they may rotate independently. The inwardly-projecting flanges $f$ (or the rings $g'$ substituted for them, as shown in Fig. 15) may also be loose. It will be seen, therefore, that the said loose rings or flanges and the loose independently-rotatable inner casing $d$ constitute loosely-rotatable members bearing against the shoulders $j$ $j$ at the ends of the journal and tending to reduce the frictional resistance due to end thrust, whether the shoulders are provided with rollers $i$ or not.

The sleeve $d$ acts as an inner support for the outer rollers during the operation of assembling the same. I propose to employ a similar sleeve as a temporary support for the inner rolls during the assembling operation, said sleeve being preferably a sheet-metal tube of the same diameter as the journal and adapted to be displaced endwise by the operation of inserting the journal, the latter taking the place of the tube.

Having thus explained the nature of my invention and described a way of constructing and using the same, although without having attempted to set forth all the forms in which it may be embodied or all the modes of its use, I declare that what I claim is—

1. A roller-bearing comprising a journal, a casing surrounding said journal, antifriction-rollers interposed between the journal and casing, and spiral separators each bearing simultaneously on the inner surface of the casing, and the peripheries of two adjacent rollers.

2. A roller-bearing comprising a journal, a casing surrounding said journal, a plurality of sets of antifriction-rollers interposed between said casing and journal, a sleeve interposed between said casing and journal and separating said sets of rollers, and means carried by the casing, sleeve and journal coöperating to prevent endwise displacement of said rollers.

3. A roller-bearing comprising a journal, a casing surrounding said journal, a plurality of sets of antifriction-rollers interposed between said casing and journal, a sleeve interposed between said casing and journal and separating said sets of rollers, said casing and sleeve being provided with end flanges, and collars mounted on said sleeve and journal, the ends of said rollers bearing against said flanges and collars.

4. A roller-bearing comprising a journal, a casing surrounding the journal, a loose sleeve interposed between the journal and casing, said sleeve and casing having inwardly-projecting beveled flanges at their ends, an outer set of antifriction-rollers interposed between the casing and sleeve and having beveled ends engaged with the beveled flanges on the casing, and an inner set of antifriction-rollers interposed between the sleeve and journal and having beveled ends engaged with the beveled flanges of the sleeve, said flanges preventing endwise displacement of the rollers relatively to the casing and sleeve.

5. A roller-bearing comprising a journal, a casing surrounding the journal, a loose sleeve interposed between the journal and casing, said sleeve and casing having inwardly-projecting beveled flanges at their ends, an outer set of antifriction-rollers interposed between the casing and sleeve and having beveled ends engaged with the beveled flanges on the casing, an inner set of antifriction-rollers interposed between the sleeve and journal and having beveled ends engaged with the beveled flanges of the sleeve, and beveled rings mounted loosely on the journal and sleeve and engaging the beveled ends of the two sets of rollers.

6. A roller-bearing comprising a rotating and a non-rotating part having opposed surfaces separated by a roller-receiving space, rollers inserted in said space and bearing simultaneously against said surfaces, and spiral separators each bearing simultaneously on one of said surfaces and on the peripheries of two adjacent rollers.

7. A roller-bearing comprising a journal, a casing surrounding said journal, a plurality of sets of antifriction-rollers interposed between said casing and journal, a sleeve interposed between said casing and journal and separating said sets of rollers, separators interposed between the rollers of each set, and means carried by the casing, sleeve and journal adapted to prevent endwise displacement of said rollers and separators.

8. A roller-bearing comprising a journal, a casing surrounding said journal, a plurality of sets of antifriction-rollers interposed between said casing and journal, a sleeve interposed between said casing and journal and separating said sets of rollers, a set of spiral separators interposed between the rollers of each set and bearing against the inner portions of said casing and sleeve, respectively, and means for holding said rollers and separators in position.

In testimony whereof I have affixed my signature in presence of two witnesses.

THOMAS A. EDWARDS.

Witnesses:
C. F. BROWN,
E. BATCHELDER.